United States Patent
Wang et al.

(10) Patent No.: US 10,876,640 B2
(45) Date of Patent: Dec. 29, 2020

(54) VALVE FOR A FAUCET ASSEMBLY

(71) Applicants: Wen Wang, Middletown, NJ (US);
 Brion Gompper, Lakewood, NJ (US)

(72) Inventors: Wen Wang, Middletown, NJ (US);
 Brion Gompper, Lakewood, NJ (US)

(73) Assignee: COMPONENT HARDWARE GROUP, INC., Lakewood, NJ (US)

( * ) Notice: Subject to any disclaimer, the term of this patent is extended or adjusted under 35 U.S.C. 154(b) by 110 days.

(21) Appl. No.: 15/612,484

(22) Filed: Jun. 2, 2017

(65) Prior Publication Data

US 2017/0350516 A1 Dec. 7, 2017

Related U.S. Application Data

(60) Provisional application No. 62/344,786, filed on Jun. 2, 2016.

(51) Int. Cl.
| | | |
|---|---|---|
| *F16K 5/00* | (2006.01) | |
| *F16K 5/04* | (2006.01) | |
| *F16K 3/04* | (2006.01) | |
| *F16K 27/04* | (2006.01) | |
| *F16K 11/00* | (2006.01) | |

(52) U.S. Cl.
CPC .............. *F16K 5/0442* (2013.01); *F16K 3/04* (2013.01); *F16K 5/0457* (2013.01); *F16K 19/006* (2013.01); *F16K 27/041* (2013.01); *F16K 27/045* (2013.01)

(58) Field of Classification Search
CPC ......... F16K 3/08; F16K 5/0442; F16K 27/041
USPC .............. 137/601.05, 625.31, 625.4, 625.41
See application file for complete search history.

(56) References Cited

U.S. PATENT DOCUMENTS

| | | | | | |
|---|---|---|---|---|---|
| 3,831,621 | A | * | 8/1974 | Anthony .................... | F16K 3/08 137/270 |
| 4,564,040 | A | * | 1/1986 | Rudelick ................. | F16K 19/00 137/454.6 |
| 4,651,770 | A | * | 3/1987 | Denham ................... | F16K 3/08 137/270 |
| 4,793,375 | A | * | 12/1988 | Marty ....................... | F16K 3/08 137/270 |
| 4,821,765 | A | * | 4/1989 | Iqbal ........................ | F16K 3/08 137/270 |
| 5,010,917 | A | * | 4/1991 | Iqbal ........................ | F16K 3/08 137/454.6 |
| 5,107,884 | A | * | 4/1992 | Orlandi ..................... | F16K 3/08 137/454.5 |
| 5,174,324 | A | * | 12/1992 | Chrysler ................... | F16K 3/08 137/315.13 |
| 5,642,754 | A | * | 7/1997 | Rabby ................... | F16K 5/0642 137/613 |

(Continued)

*Primary Examiner* — Reinaldo Sanchez-Medina
(74) *Attorney, Agent, or Firm* — Francis C. Hand; Carella, Byrne, et al.

(57) ABSTRACT

The valve has a pair of mutually rotatable ceramic valve bodies within the bonnet that cooperate to allow a flow of water in one relative position and to block a flow of water in a second relative position. One valve body is engaged by the valve stem to rotate therewith while the second valve body is held fixed within the bonnet via radial projections that fit into recesses in the bonnet. An elastomeric ring of square cross-section is squeezed against the non-rotatable valve body by a spiral retaining ring that is positioned in a circumferential groove in the bonnet.

9 Claims, 7 Drawing Sheets

(56) References Cited

U.S. PATENT DOCUMENTS

| | | | | |
|---|---|---|---|---|
| 5,681,028 A | * | 10/1997 | Cook | F16K 3/08 |
| | | | | 137/454.5 |
| 5,732,734 A | * | 3/1998 | Buccicone | F16K 3/08 |
| | | | | 137/454.6 |
| 6,279,605 B1 | * | 8/2001 | Wang | F16K 3/08 |
| | | | | 137/454.5 |
| 6,431,211 B1 | * | 8/2002 | Wang | F16K 3/08 |
| | | | | 137/625.31 |
| 7,461,669 B2 | * | 12/2008 | Jonte | F16K 27/045 |
| | | | | 137/454.5 |
| 8,752,575 B2 | * | 6/2014 | Kacik | F16K 3/04 |
| | | | | 137/454.6 |
| 9,303,391 B2 | * | 4/2016 | Leichty | E03C 1/0403 |
| 2007/0209720 A1 | * | 9/2007 | Chang | F16K 31/607 |
| | | | | 137/625.31 |

\* cited by examiner

VALVE FOR A FAUCET ASSEMBLY

This application claims the benefit of Provisional Patent Application 62/344,786, filed Jun. 2, 2017.

This invention relates to a valve for a faucet assembly.

As is known, various valve constructions have been used for controlling the flow of water from a sink, particularly, commercial sinks. Over time, many of these valves leak, become corroded or otherwise wear and require replacement. In particular, at high pressure, such as 500 psi, many of these known valves experience leakage.

It is an object of the invention to provide a valve that is constructed for a long-useful life.

It is another object of the invention to provide a valve that is resistant to leakage at high pressure.

The valve is constructed for use to control a flow of hot water or cold water from a faucet assembly and, particularly, to operate as a quarter turn valve.

Briefly, the valve comprises a bonnet, a pair of mutually rotatable valve bodies within the bonnet that cooperate to allow a flow of water in one relative position and to block a flow of water in a second relative position, a stem for rotating one of the valve bodies and a spiral internal retaining ring biasing the valve bodies into contact.

The bonnet is made of tubular shape with a pair of diametrically disposed openings in a periphery thereof for delivering water from the valve to a faucet.

One valve body is coaxially disposed in the bonnet in stationary relation and defines a pair of diametrically disposed passages for passage of water therethrough from the source of water.

The other valve body is also coaxially disposed in the bonnet in contact with the first valve body and defines a pair of passages communicating with the openings in the bonnet.

Each valve body is made of ceramic in order to provide a long-life to the valve.

The stem is rotatably mounted in and projects upwardly from the bonnet, for example to receive a handle. The stem is operatively connected to the second (rotatable) valve body for rotating the valve body between a first (open) position with the pair of passages therein aligned with the diametrically disposed passages in first (stationary) valve body to allow water from the source of water to flow through the first valve body and through the openings in the bonnet and a second (closed) position with the pair of passages therein out of alignment with the diametrically disposed passages in the first valve body to block a flow of water from the source of water from flowing through the first valve body.

During operation, a handle is used to turn the stem a quarter turn, i.e. 90° to open or close the valve.

An elastomeric ring of square cross-section is abutted against the stationary valve body and a spiral retaining ring is positioned in a circumferential groove in the bonnet to bias the elastomeric ring against the stationary valve body and, thus, the stationary valve body against the rotatable valve body.

These and other objects and advantages of the invention will become more apparent from the following detailed description taken in conjunction with the drawings wherein.

Figure 1:
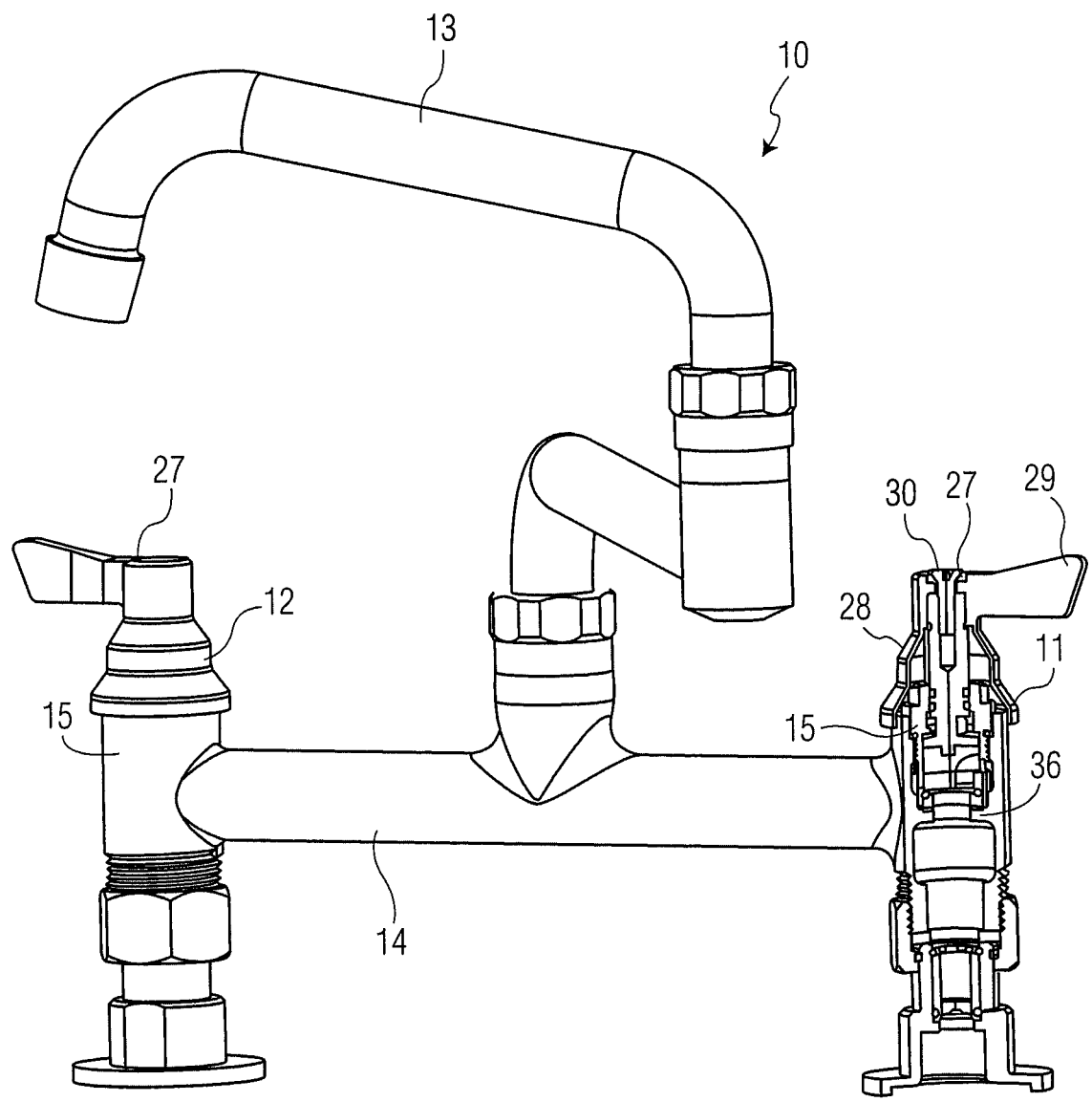
FIG. 1 illustrates a partial cross-sectional view of a faucet assembly employing a valve in accordance with the invention.

Referring to FIG. 1, the faucet assembly 10 is of generally known construction having a cold water tap 11 and a hot water tap 12 for delivering water to a centrally located spigot 13.

As indicated, cold water is delivered from a suitable source upwardly into the cold water tap 11 for delivery into a horizontal conduit 14 connected to the spigot 13. In a similar manner, hot water is delivered from a suitable source upwardly into the hot water tap 12 for delivery into a horizontal conduit 14.

Each tap 11, 12 of the faucet assembly 10 houses a valve 15 for controlling the flow of water through the tap 11, 12 into the conduit 14 for delivery via the spigot 13.

Figure 2:
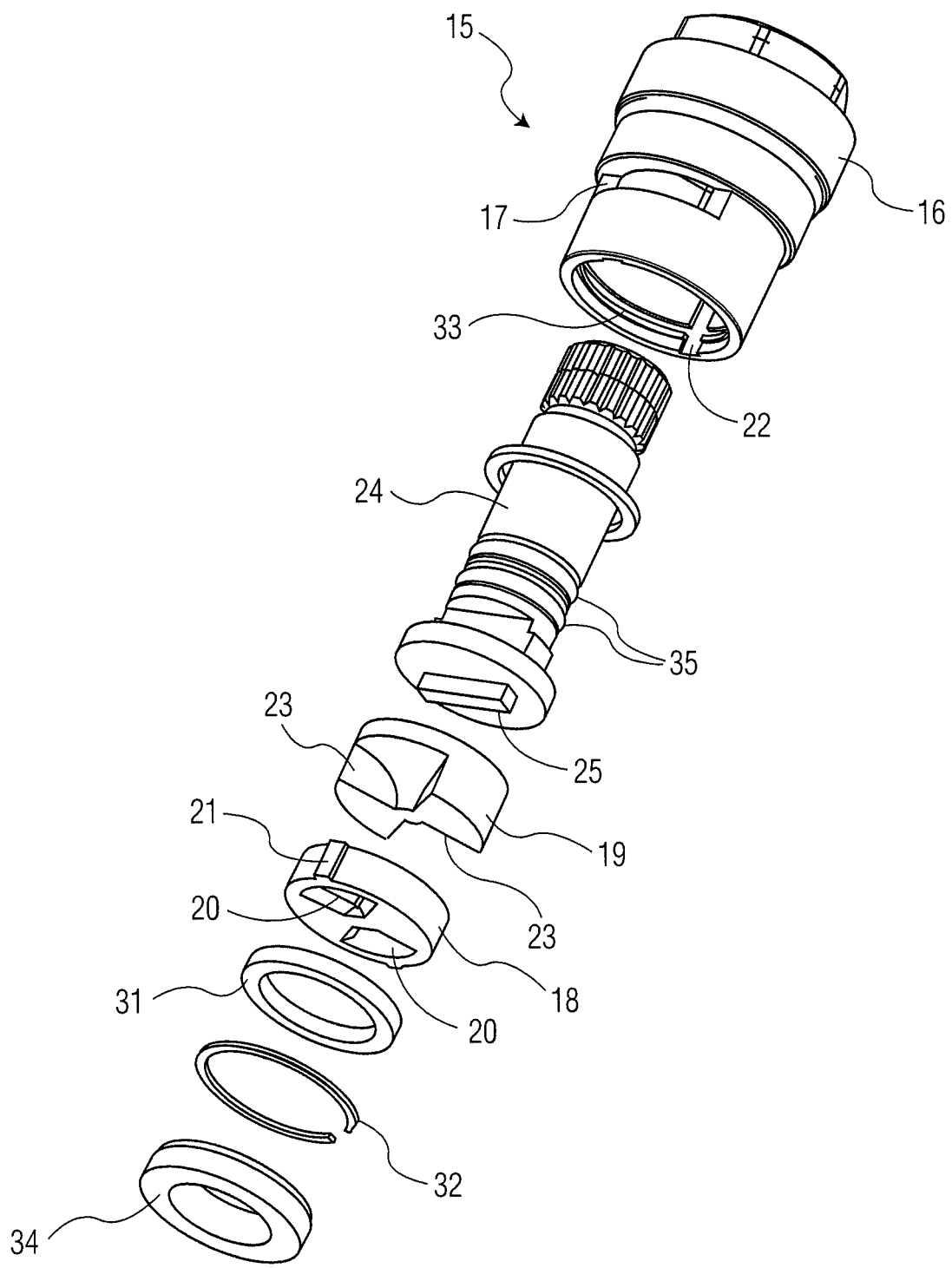
FIG. 2 illustrates an exploded view of the valve in accordance with the invention.
Figure 5:
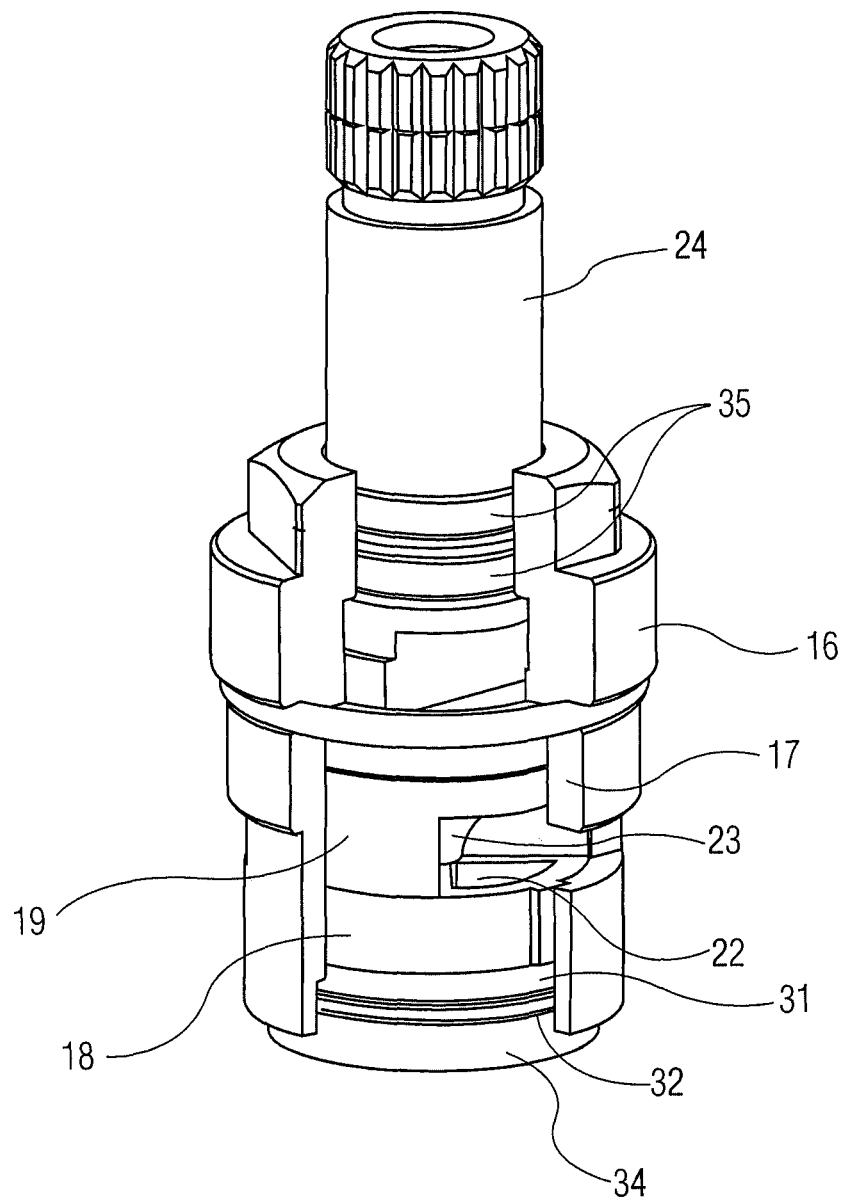
FIG. 5 illustrates a part cross-sectional perspective view of the valve of FIG. 3.

Referring to FIGS. 2 and 5, each valve 15 includes a bonnet 16 of tubular shape having a pair of diametrically disposed openings 17 (only one of which is shown) in a periphery that allow a flow of water to pass from within the tap 11 (12) into the horizontal conduit 14.

Each valve 15 also has a pair of mutually rotatable valve bodies 18, 19 within the bonnet 16 that cooperate to allow a flow of water in one relative position and to block a flow of water in a second relative position.

The one valve body 18 is coaxially disposed in the bonnet 16 in non-rotatable relation thereto and defines a pair of diametrically disposed passages 20 therein for passage of water therethrough. As illustrated, the valve body 18 has a pair of radial projections 21 on a peripheral surface thereof that are spaced 180° apart and the bonnet 16 has a pair of diametrically opposed recesses 22 for receiving the projections 21.

The other valve body 19 is coaxially disposed in the bonnet 16 in contact with the first valve body 18 and defines a pair of passages 23 communicating with the openings 17 in the bonnet 16.

Each valve 15 also has a stem 24 rotatably mounted in and projecting from the bonnet 16.

The stem 24 includes a diametrically disposed projection 25 on a bottom end and the adjacent valve body 19 has a recess 26 receiving the diametrically disposed projection 25 for rotation of the valve body 19 between a first (open) position (FIG. 3) with the pair of passages 23 therein aligned with passages 20 in the non-rotatable valve body 18 to allow water to flow upwardly through said first valve body and through the openings 17 in the bonnet 16 and a second (closed) position (FIG. 4) with the pair of passages 23 therein out of alignment with passages 20 in the non-rotatable valve body 18 to block a flow of water from flowing through the non-rotatable valve body 18.

The stem 24 is otherwise of conventional construction.

As indicated in FIG. 1, a one piece element 27 that forms a cap 28 and a handle 29 is fitted over the stem 24 is secured to the stem 24 by a screw 30 in a conventional manner in order to turn the stem over a 90° arc, i.e. a quarter turn.

The valve 15 also has an elastomeric ring 31 of square cross-section that has a flat top surface that abuts the non-rotatable valve body 18. When in use, the elastomeric ring 31 is squeezed against the non-rotatable valve body 18 and the flat surfaces ensure an even pressure on the valve body to avoid leakages under a high pressure such as 500 psi.

Each valve 15 has a spiral internal retaining ring 32 for biasing the elastomeric ring 31 against the non-rotatable valve body 18 as well as to bias the non-rotatable valve body 18 into contact with the other valve body 19. This retaining ring 32 is positioned in a circumferential groove 33 in the bonnet 16 (see FIG. 2) and prevents the stem 24, valve bodies 18, 19 and elastomeric ring 31 from falling out.

The spiral internal retaining ring 32 is small and saves space within the bonnet 16 thereby reducing the wet area of the faucet assembly 10 and reducing the amount of material required for the bonnet 16.

The valve also has a washer 34 disposed in contact with the spiral internal retaining ring 32 on a side opposite the elastomeric ring 31. The washer 34 is made of a rubber compound so as to be fitted into the bonnet 16 in a friction fit manner.

Referring to FIG. 1, the washer 34 projects from the bonnet 16 and is held in place by a friction fit within the bonnet 16.

Figure 3:
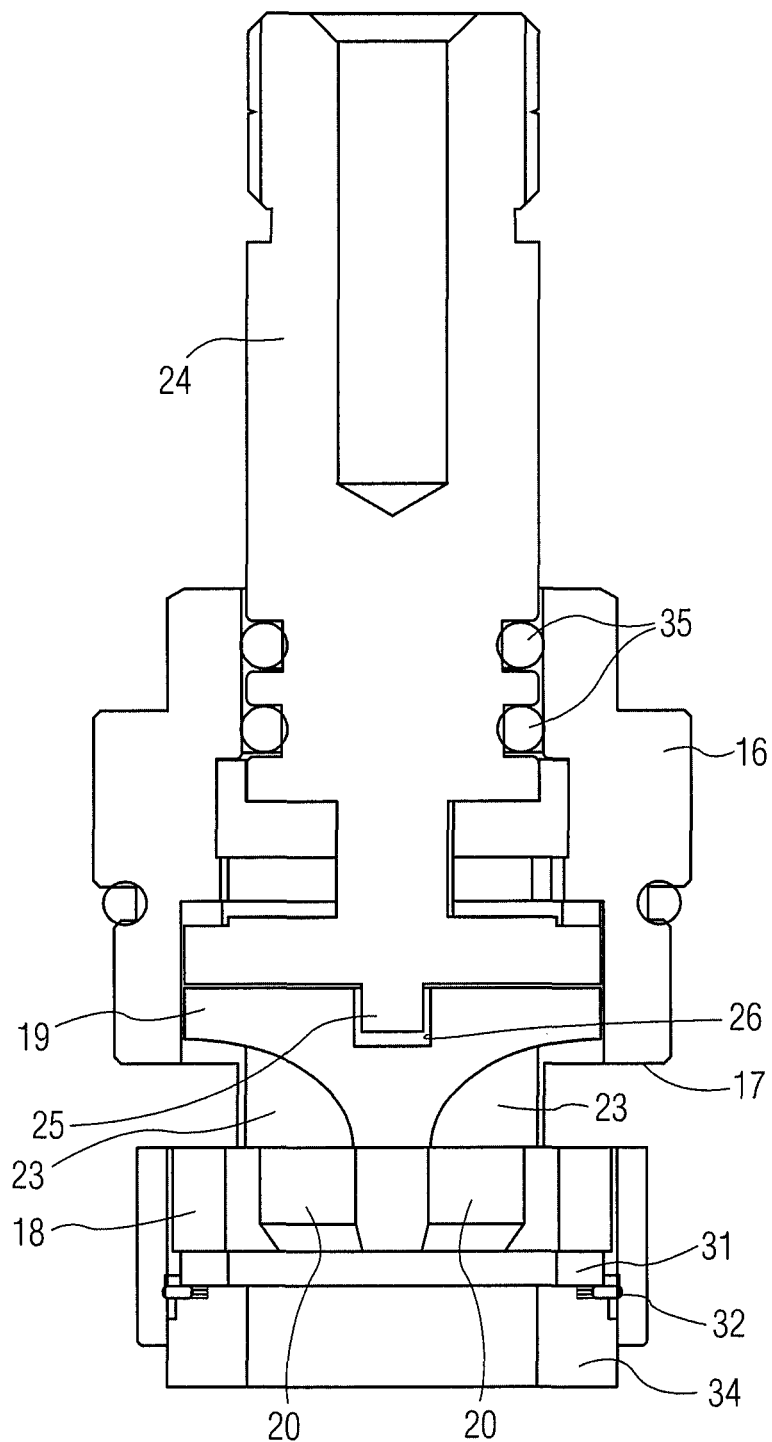
FIG. 3 illustrates a cross-sectional view of the valve in an open position in accordance with the invention.
Figure 4:
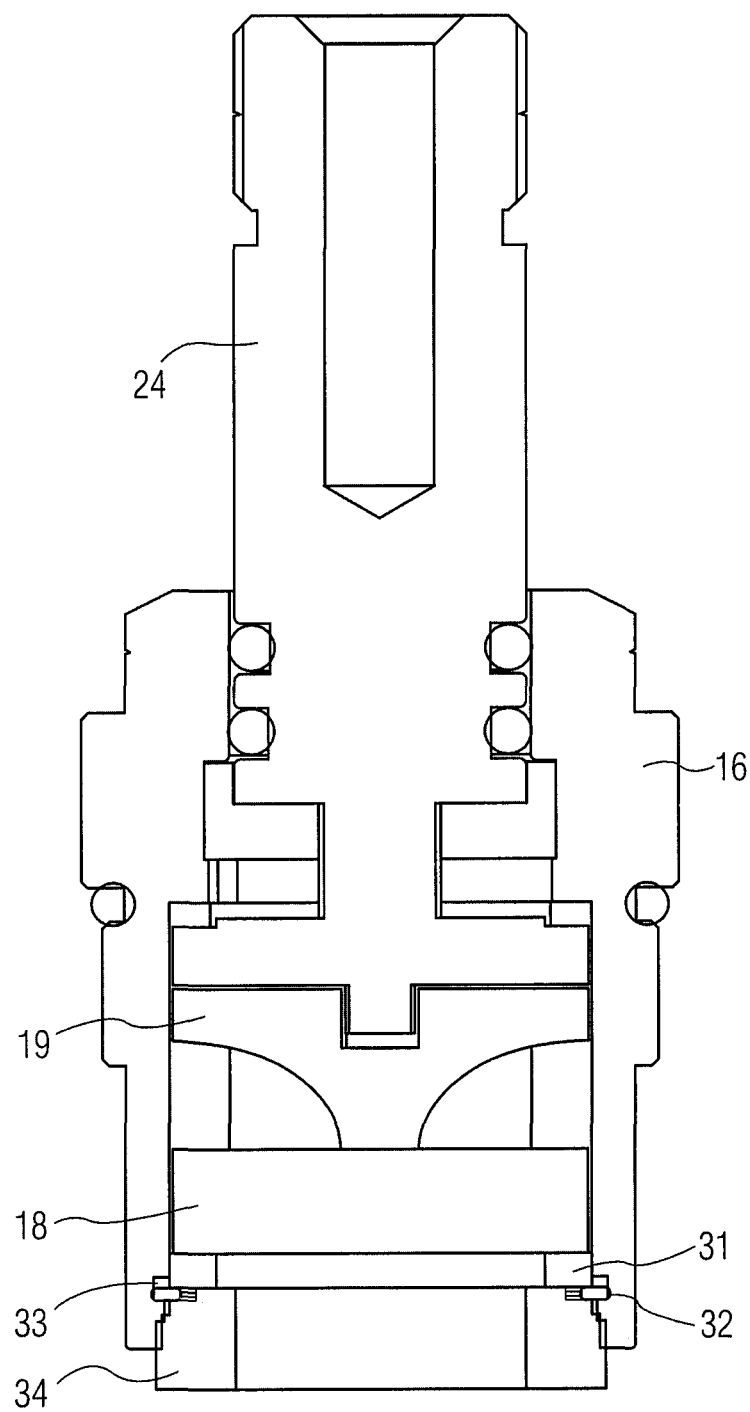
FIG. 4 illustrates a cross-sectional view of the valve of FIG. 3 in a closed position.

In order to assemble the valve 15, the stem 24 is slid into the bonnet 16 to project therefrom as illustrated in FIG. 3. Suitable O-rings 35 are provided in annular grooves 36 on the stem 24 to seal against the bonnet 16.

Next, the valve body 19 is slid into the bonnet 16 such that the recess 26 in the valve body 19 receives the projection 25 on the bottom of the stem 24. Thereafter, the valve body 18 is slid into the bonnet 16 to seat against the rotatable valve body 19 with the projections 21 siding in the grooves 22 in the bonnet 16. A suitable oil may be placed between the valve bodies 18, 19 to facilitate a frictionless relative rotation between the valve bodies 18, 19.

Figure 6:
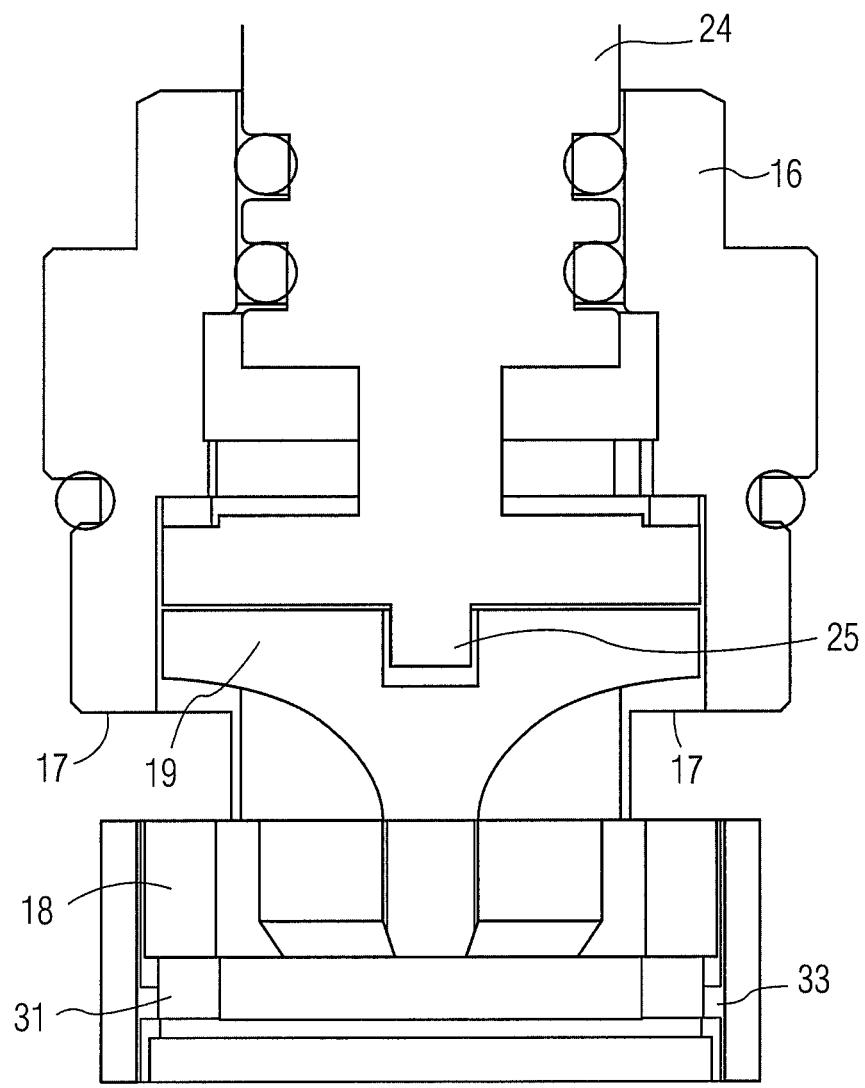
FIG. 6 illustrates a cross-sectional view of the valve during assembly prior to positioning of the spiral retaining ring.

Next, as illustrated in FIG. 6, the elastomeric washer 31 is positioned in the bonnet 16 against the stationary valve body 19. In this respect, the washer 31 is slightly compressed radially to fit within the bonnet 16. For example, where the bonnet 16 has an inside diameter of 0.618, the washer 31 has a diameter of 0.628 before insertion into the bonnet 16.

Figure 7:
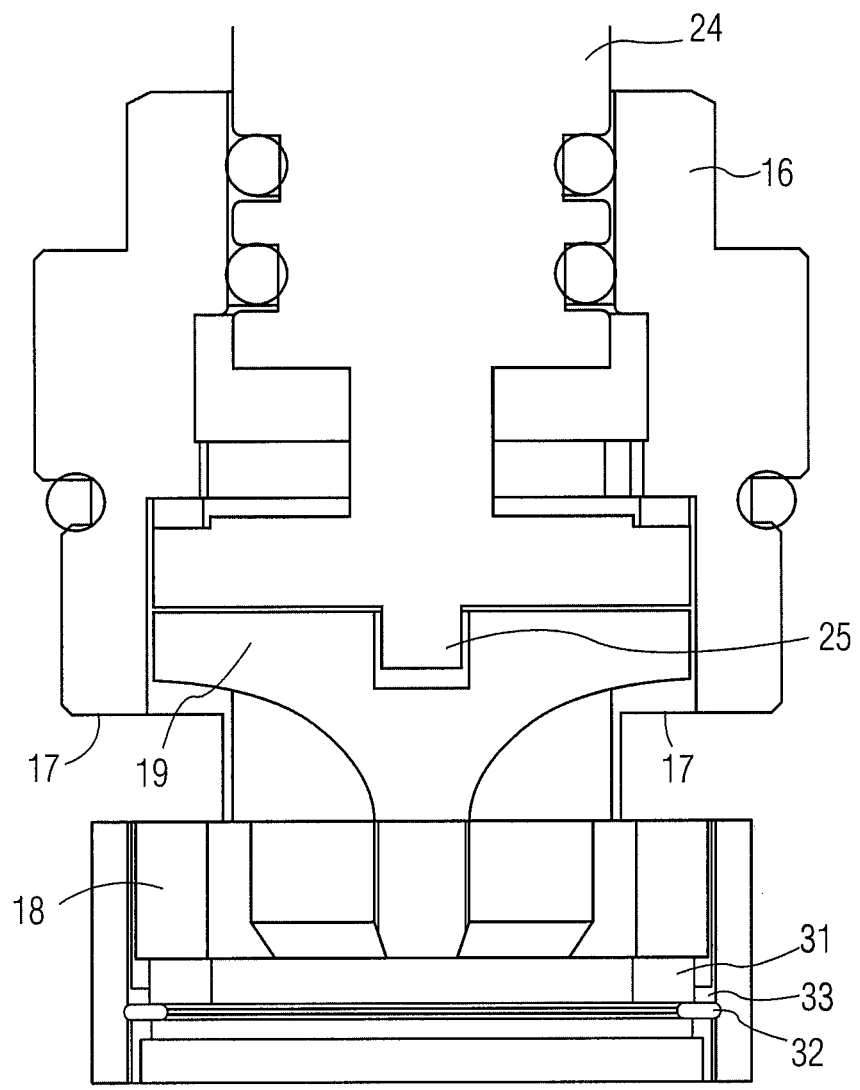
FIG. 7 illustrates a cross-sectional view of the valve during assembly after positioning of the spiral retaining ring.

Thereafter, as illustrated in FIG. 7, the spiral retaining ring 32 is inserted into the groove 33 of the bonnet 16 while being longitudinally compressed. When positioned in the groove 33, the spiral ring 32 tends to expand longitudinally so as to place a compressive force on the elastomeric ring 31 causing the elastomeric ring 31 to compress against the stationary valve body 18. At the same time, the elastomeric ring 31 will be squeezed around 18% after positioning of the retaining ring 32 in the groove 33.

In this respect, the spiral retaining ring 32 has a width that is sufficient to allow the spiral ring 32 to be positioned in the groove 33 of the bonnet 16 and to press against a peripheral area of the elastomeric ring 31.

Finally, the washer 34 is fitted into the bonnet 16 and against the spiral retaining ring 32. (See FIG. 3) The valve 15 is thus ready to be fitted into a tap 11, 12.

As illustrated in FIG. 1, when positioned in a tap 11, the washer 34 of the valve 15 seats on a radially inwardly directed flange 36 within the faucet body of the tap 11. After positioning of the valve 15 in the tap 11, the cap 27 is passed over the projecting stem 24 of the valve 15 and secured to the stem 24 by the screw 30.

Opening and closing of the valve 15 is effected by turning the handle 26 a quarter turn.

The invention thus provides a valve that is constructed for a long-useful life and one that is resistant to leakage at high pressure, for example at pressures of 500 psi.

What is claimed is:

1. A valve for a faucet assembly comprising
    a bonnet of tubular shape having a pair of diametrically disposed openings in a periphery thereof;
    a first valve body coaxially disposed in said bonnet in stationary relation thereto, said valve body defining a pair of diametrically disposed passages therein for passage of water therethrough from a source of water,
    a second valve body coaxially disposed in said bonnet in contact with said first body, said second valve body defining a pair of passages communicating with said openings in said bonnet;
    a spiral retaining ring biasing said first valve body into contact with said second valve body; and
    a stem rotatably mounted in and projecting from said bonnet, said stem being operatively connected to said second valve body for rotating said second valve body between a first position with said pair of passages therein aligned with said diametrically disposed passages in said first valve body to allow water from the source of water to flow through said first valve body and through said openings in said bonnet and a second position with said pair of passages therein out of alignment with said diametrically disposed passages in said first valve body to block a flow of water from the source of water from flowing through said first valve body.

2. A valve as set forth in claim 1 wherein said first valve body is made of ceramic and said second valve body is made of ceramic.

3. A valve as set forth in claim 1 further comprising an elastomeric ring of square cross-section disposed between said spiral retaining ring and said first valve body.

4. A valve as set forth in claim 3 further comprising a washer disposed in contact with said spiral retaining ring on a side opposite said elastomeric ring.

5. A valve as set forth in claim 1 wherein said first valve body has a radial projection on a peripheral surface thereof and said bonnet has a recess receiving said projection.

6. A valve as set forth in claim 1 wherein said stem includes a diametrically disposed projection and said second valve body has a recess receiving said diametrically disposed projection for rotation of said second valve body.

7. A valve for a faucet assembly comprising
    a bonnet of one piece tubular shape having a pair of diametrically disposed openings in a periphery thereof, a pair of diametrically opposed recesses therein and a circumferential groove therein;
    a first valve body coaxially disposed in said bonnet in stationary relation thereto, said valve body defining a pair of diametrically disposed passages therein for passage of water therethrough from a source of water and having a pair of radial projections received in said recesses of said bonnet;
    a second valve body coaxially disposed in said bonnet in contact with said first body, said second valve body defining a pair of passages communicating with said openings in said bonnet;
    a spiral retaining ring positioned in said circumferential groove of said bonnet biasing said first valve body into contact with said second valve body; and
    a one piece stem rotatably mounted in and projecting from said bonnet, said stem being operatively connected to said second valve body for rotating said second valve body between a first position with said pair of passages therein aligned with said diametrically disposed passages in said first valve body to allow water from the source of water to flow through said first valve body and through said openings in said bonnet and a second position with said pair of passages therein out of alignment with said diametrically disposed passages in said first valve body to block a flow of water from the source of water from flowing through said first valve body.

8. A valve as set forth in claim 7 further comprising an elastomeric ring of square cross-section disposed between said spiral retaining ring and said first valve body.

9. A valve as set forth in claim 8 further comprising a washer friction fit in and projecting from said bonnet and disposed in contact with said spiral retaining ring on a side opposite said elastomeric ring.

\* \* \* \* \*